United States Patent [19]
Lippiatt

[11] Patent Number: 5,199,463
[45] Date of Patent: Apr. 6, 1993

[54] METHOD FOR REMOTELY LINING CONDUITS

[75] Inventor: Raymond Lippiatt, Wimbourne, Great Britain

[73] Assignee: Subterra Limited, Wimbourne, United Kingdom

[21] Appl. No.: 680,674

[22] Filed: Apr. 5, 1991

[30] Foreign Application Priority Data

Apr. 5, 1990 [GB] United Kingdom ............... 9007719

[51] Int. Cl.⁵ ................................................ F16L 1/00
[52] U.S. Cl. ......................................... 138/98; 138/93;
264/269; 156/287; 405/154
[58] Field of Search .............. 138/97, 93, 98, 103, 138/178; 264/269, 270; 156/287; 405/150, 154

[56] References Cited

U.S. PATENT DOCUMENTS

| | | | |
|---|---|---|---|
| 1,605,782 | 11/1926 | Rota | 138/98 |
| 2,312,993 | 3/1943 | Stephens | 138/98 |
| 3,363,301 | 1/1968 | Delaruelle | |
| 4,009,063 | 2/1977 | Wood | 138/97 |
| 4,848,407 | 7/1989 | Smith et al. | 138/97 |
| 5,049,003 | 9/1991 | Barton | 138/97 |

FOREIGN PATENT DOCUMENTS

| | | | |
|---|---|---|---|
| 96084 | 11/1960 | Netherlands | 138/93 |
| 611994 | 6/1979 | Switzerland . | |
| 2074691 | 11/1981 | United Kingdom | 138/97 |
| 2136912 | 9/1984 | United Kingdom | 138/97 |
| 900567 | 5/1990 | World Int. Prop. O. | 138/97 |
| 91/02920 | 3/1991 | World Int. Prop. O. . | |

Primary Examiner—James E. Bryant, III
Attorney, Agent, or Firm—Larson and Taylor

[57] ABSTRACT

A conduit is lined by pressing a liner into contact with the conduit and making it self-supporting. It is transported to the working site (at which its two ends are not at manholes or excavations entering the conduit) on a core with an inflator bag. The core can be made flexible to assist entry to the conduit and rigid to provide transport along the conduit. The bag is inflated at the site to press the liner into contact with the conduit. The liner is made self-supporting by curing an impregnating resin or by sticking it to the conduit. The bag is deflated and the core is removed. The bag may have a limited response to inflation pressure so it does not balloon into voids in the conduit wall. It may have a progressive response to inflation pressure so that it expands from its mid-point towards its ends.

8 Claims, 2 Drawing Sheets

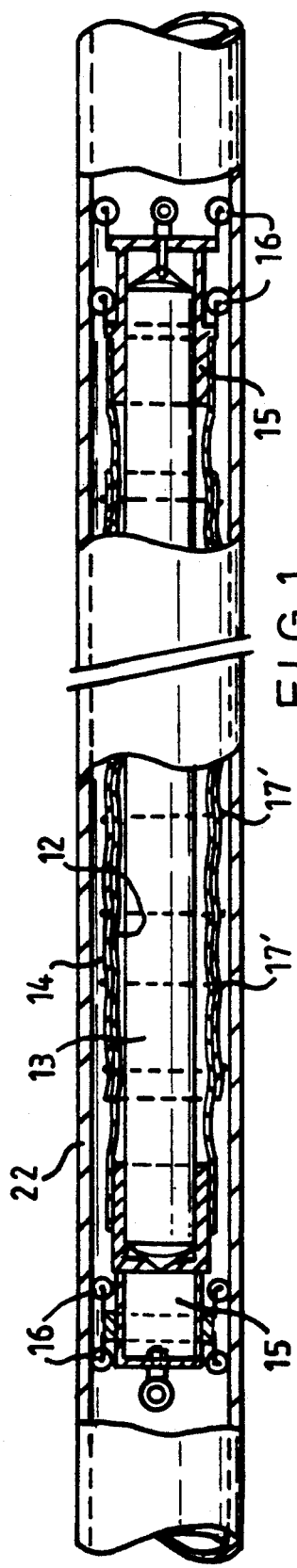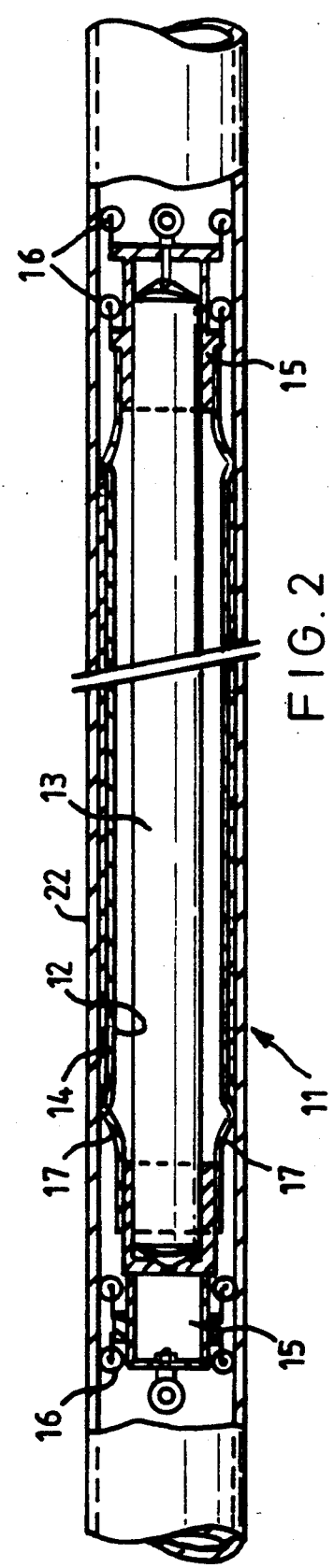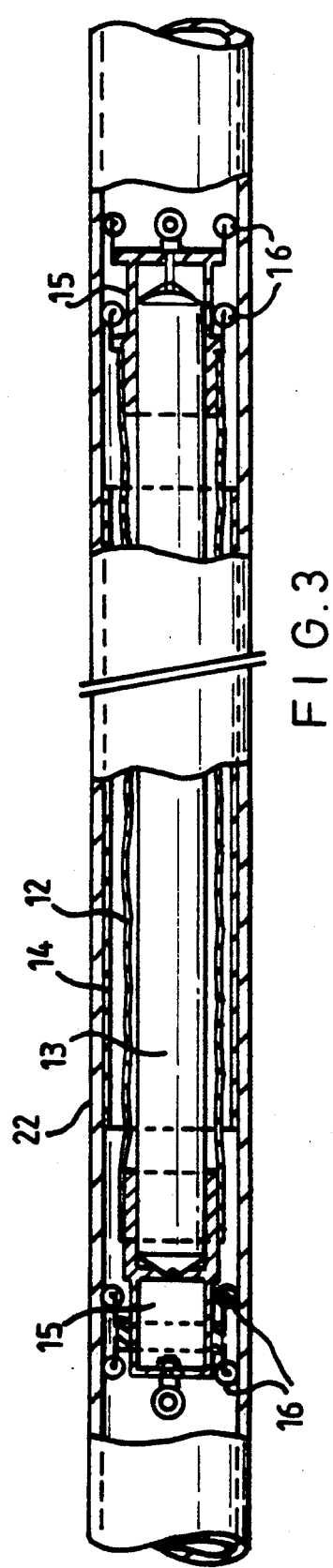

METHOD FOR REMOTELY LINING CONDUITS

FIELD OF THE INVENTION

This invention relates to the lining of conduits in need of repair.

BACKGROUND OF THE INVENTION

As an alternative to replacing a conduit which has ceased to fulfil its intended purpose satisfactorily, inserting a liner into a conduit often serves to prolong its useful life by preventing escape of fluids carried by the conduit to the surroundings through the walls of the conduit, preventing ingress of fluids in the surroundings through the walls of the conduit into the bore and by giving additional strength to the walls of the conduit. Commonly these linings are inserted to and from access points (such as manholes or excavations) as one continuous section lining extending between the two points of access. However if the distance between two access points is so long that more than one section of lining is required, the lining sections have to be located with their ends at points remote from the access points and this requires remote control. These location problems have been overcome by inserting, under remote control, a deformed liner section into the conduit which when deformed provides adequate clearance between the liner and the conduit to allow free passage of the liner through the conduit to the desired position in the conduit and then reforming the liner section into contact with the conduit walls, by remote control, when the liner section is in the desired position along the length of the conduit.

Further problems are encountered when a liner is expanded in to contact with the walls of the conduit since air or other fluid may become trapped between the liner and the conduit, preventing the liner expanding to its full extent so that its flow capacity is reduced and preventing the liner from supporting the walls of the conduit over their whole area. When the conduit is laid in water-bearing soil, water may be able to penetrate the conduit and cause trouble if the liner does not seal the walls of the conduit completely or if the arc of the lining is deformed.

Another problem occurs if in one location the conduit has broken away and the conduit contents have washed away the surrounding soil. If a standard liner is inserted in such a location, the lack of support for the liner at the broken away location will, when subjected to high expansion forces, allow the liner to balloon out into the void where it will become very thin and probably burst.

Previous lining methods have been limited to lining joints by short lengths of liner (30-100 cms) or to lining conduits from one manhole or excavation to another. The present invention is able to deal with long lengths of liner (say 2-30 meters) lining a conduit over lengths which do not necessarily end at the manhole or excavation. This requires the lining to be transported along the conduit from a manhole or excavation, for a distance of say 5-500 meters.

SUMMARY OF THE INVENTION

The invention attempts to overcome the problem of lining a length of conduit at least one end of which is not accessible from a manhole or excavation as set hereinbelow.

The core for the liner provides a support for the liner when it is moved into position, keeping the liner (and its protective cover if provided) away from the walls of the conduit during transit. For this purpose a rigid beam with a wheeled or skidded carriage at either end is ideal, but such a beam would be impossible to insert into a conduit whose only access is down a vertical narrow bore manhole with a sharp right angle turn of say 0.5 m radius at the bottom to enter the conduit. This is why we provide a core which is flexible in order to enter the manhole and then turn from the manhole into the conduit around sharp curves and then becomes rigid for support of the liner for transit along the conduit into the required position. The core can comprise a series of hinged links which can be selectively locked together to form a rigid beam. The links may comprise a series of tubes hinged together at their ends with locking sleeves which can be moved across the hinged portion to keep them in alignment. In another arrangement, the tube links can be hinged together at one point on their circumference for hinging movement limited to a maximum of 180° (when the tubes are aligned), the links being rotatable about the axis of the tube so that the hinges lie on the outside of the curve when they are required to follow a curved path into the manhole and from the manhole to the conduit, the hinge angles being less than 180°, and are then rotated so that the hinges lie along the top portion of the beam core when transporting the liner along the conduit, keeping the tubes aligned because all the hinges are at their 180° limit.

An alternative form of core comprises an inflatable tube. During movement into the manhole and from the manhole to the conduit, the core has an internal pressure below atmospheric so that it can be easily bent around corners. When it is required to support the inflator bag, the liner and its cover for transit along the conduit, it is inflated above atmospheric pressure in order to assume a rigid cylindrical form to provide support for the inflator bag and liner.

With all these cores, air can be extracted from the annular passages between the liner and the core during insertion so that the inflator bag and liner are collapsed onto the core and assume minimum dimensions. The normal shape of the inflator bag preferably includes tapered end portions, whose minimum diameter ends are secured to the core, the inflator bag in its normal disposition tapering to a bigger diameter than the core and extending uniformly with this bigger diameter (which is comparable with that of the conduit) along the length of the core to the tapered portion at the other end. This bigger diameter is collapsed onto the core during transit along the conduit, the inflator bag being allowed to resume its normal size by ingress of air when it is at the desired position along the conduit before it is fully expanded urging the lining into contact with the conduit walls by additional pressure being applied.

In another aspect, the invention attempts to overcome the problem of ballooning out of the liner into a void in the conduit as mentioned above by apparatus as also set out hereinbelow. If the difference between expansion and deflation is not sufficient to allow good clearance between the unexpanded liner and the conduit when it is being inserted, additional clearance can be achieved by providing a central core for the liner and reducing the pressure in the bag below atmospheric so as to contract it onto the core to give greater room for the collapsed liner within the conduit during transport to its final location.

In another aspect, the invention attempts to solve the problem of fluid entrapment by the disclosed apparatus.

DESCRIPTION OF THE DRAWINGS

The accompanying drawings illustrate an embodiment of the invention in which:

FIG. 1 is a section through a conduit with the liner assembly in its transport condition with the liner wrapped and loosely tied on the inflator bag as during insection, FIG. 2 shows the assembly of FIG. 1 with the inflator bag inflated to a holding pressure, FIG. 3 shows the assembly of FIG. 1 after curing of the liner and deflation of the inflator bag to a vacuum.

DESCRIPTION OF PREFERRED EMBODIMENT

Figure 4:
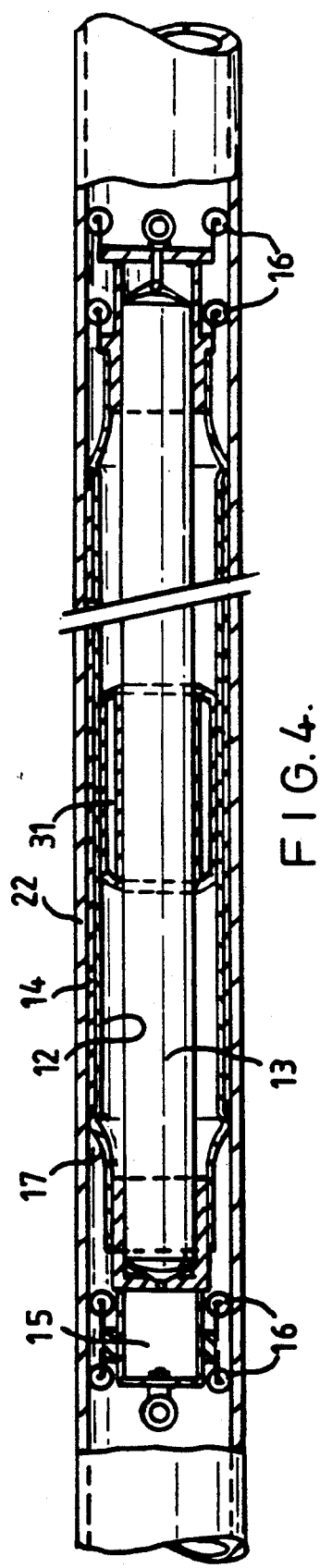
FIG. 4 shows a modification of FIG. 1 with an additional central inflator bag which is inflated in advance of the main bag to ensure that the combined effects of the two bags is to urge the liner into contact with the conduit first at its central portion.

A liner assembly 11 comprises an inflatable bag 12 around the core 13, over which bag is a liner 14 and an optional protective cover (not shown). The liner material is preferably felt, glass fibre or woven fabric, but can be any material with means of carrying resin for curing. The material is impregnated with an uncured resin which, when the liner is in position, is cured to give strength and impermeability to the lined conduit against fluid flow into and out of the conduit through its walls. The liner 14 has an interior barrier layer to prevent adhesion to the inflator bag 12.

The core 13 has a carriage 15 at either end with wheels 16 which are movable outwards to engage the conduit walls. The inflator bag is tapered to a smaller diameter at its ends 17. The inflator bag 12 is designed so that it will not expand beyond a certain dimension, e.g., 10% or 50% greater than the core diameter and so that it expands progressively from the mid-point of its length towards its two ends as the inflation pressure is increased.

Figure 5:
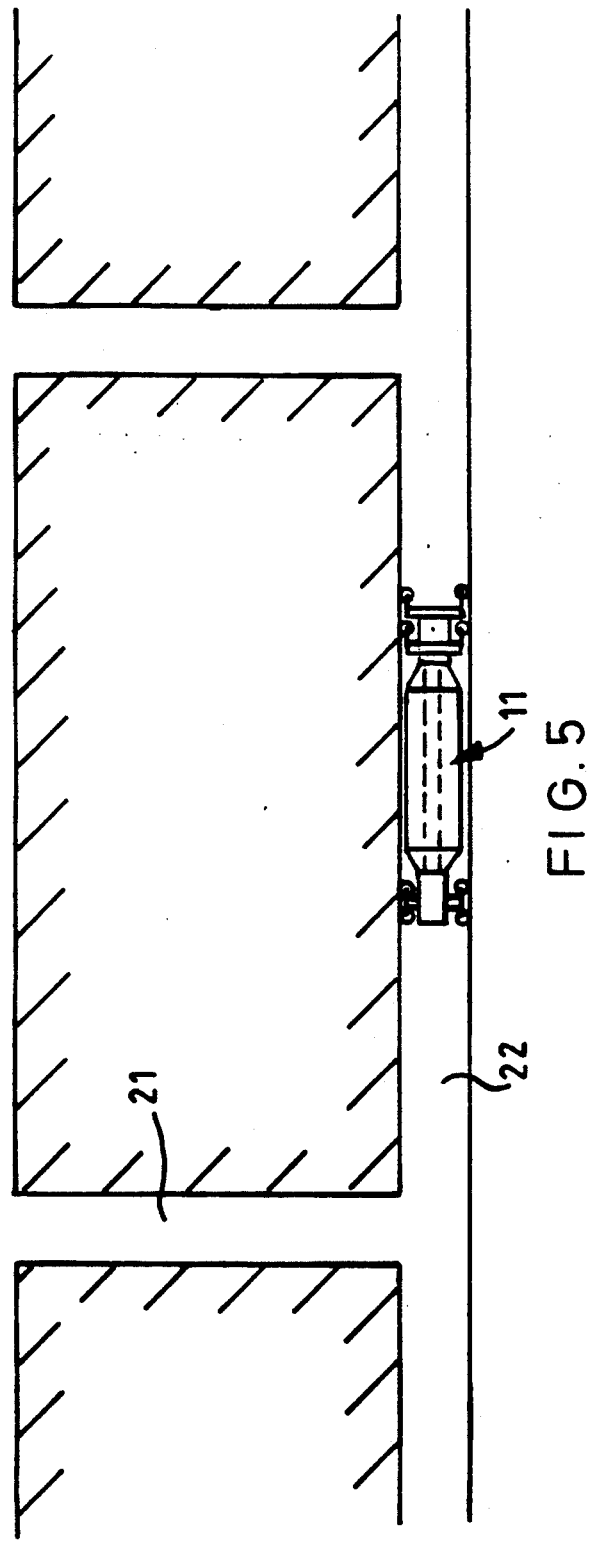
FIG. 5 is a small scale diagram of a conduit and its access manholes.

The liner assembly 11 is assembled on the ground near a manhole 21 giving access to the conduit 22 as shown in FIG. 5. An air pump (not shown) is connected to the interior of the core 13 if it is of the inflatable type and to the inflator bag 12 between the core and the liner 14 to extract air from the bag to contract it to minimum dimensions. With the core 13 in its flexible disposition, the bag 12 evacuated and loose ties 17, around the liner under its cover, the assembly is moved along a curved path from the ground into the vertical manhole shaft and from the bottom of the manhole shaft into the conduit.

The core is now locked into its rigid disposition, either by inflation of the core or locking of the hinged portions or turning the hinged portions so they will not droop between or beyond the supports of the wheels. The wheels of the carriages are extended into contact with the walls of the conduit and the protective cover is removed from the liner, and the whole assembly moved along the conduit until the liner 14 is at the location where lining is to take place. The liner is expanded by allowing air into the bag 12 and then applying air under pressure to expand it beyond its normal dimensions to force the liner into contact with the conduit walls so that it seals against them. The resin impregnating the liner is cured either under ambient conditions or by heat to give strength and impermeability to the liner conduit. Over-expansion of the liner into any voids is prevented by the limited expansion properties of the inflator bag 12. Air and fluid entrapment is avoided by causing the bag to expand from the centre of its length outwards. At the end of the operation, the bag 12 is exhausted of air and the core 13 and the bag 12 are then removed from the interior of the liner and the core 13 is deflated or its hinges unlocked when it is required to move from the conduit into the manhole shaft 23 from the point of exit from the conduit.

Making the liner 14 self-supporting may be achieved by causing it to stick to the conduit walls. This may be achieved by curing the impregnating resin or by curing an adhesive layer on the outer surface of the liner. If the liner is required not to stick to the conduit, a further interlayer of plastics material may be provided to separate the curing resin from the conduit. Suitable plastics include polyethylene, nylon, and polypropylene.

The problems of fluid entrapment are negligible with liners of lengths of the order of 1 meter which are simply used to line joints between conduits but when a complete length of conduit requires lining with liners of the order of up to 30 meters, the problems of fluid entrapment become much more acute, which is when is when the longitudinal progression of inflation of the inflator bag becomes useful. The progressive expansion of the bag may be achieved by a progressive resistance to expansion along the length of the material of the bag from the centre. Alternatively the bag could be divided so that secions at different longitudinal positions have progressively increasing resistance to inflation pressure from the centre. FIG. 4 shows another alternative where an extra, inner, bag 31 is provided which is inflated before the main bag 12, so that the liner is pressed against the conduit at the mid-point first, and later on either side when the main bag 12 is inflated.

Typical pressures applied to the interior of the liner of about 22 cm diameter of the order of 1,500,000 Pa. Such pressures can be used to force a partially collapsed conduit back to its original round shape, thus improving the carrying capacity of the previously collapsed conduit and the resultant line section. During expansion of the liner, the pressure in the core if it is inflatable must always be greater than that in the lining in order that the pressure of the lining does not collapse the core. A core of about 15 cms diameter would require a pressure of 140,000 Pa to 1,400,000 Pa to maintain rigidity over a 10 meter length.

I claim:

1. A method of lining a conduit comprising locating a length of lining material on an inflator bag provided on a core to form an assembly, the core having a flexible state and a rigid state, inserting the assembly into the conduit while the core is in its flexible state, supporting the inflator bag and liner on the core by changing the state of the core from the flexible state to the rigid state to maintain an outer shape of the inflator bag, transporting the assembly down the conduit to the location to be lined, inflating the inflator bag to press the liner into contact with the conduit, making the lining self-supporting, deflating the inflatable bag and removing the inflator bag and core from the location.

2. A method as claimed in claim 1 wherein the lining material is impregnated with a curable resin and the lining is made self-supporting by curing the resin.

3. A method as claimed in claim 1 wherein an interlayer is provided outside the lining material to prevent the lining material adhering to the conduit when it is made self-supporting.

4. A method as claimed in claim 1 wherein the core is inflatable, being changed from its flexible state to its rigid state when it is inflated.

5. A method as claimed in claim 1 wherein the inflator bag is inflatable only to a predetermined maximum dimension.

6. A method as claimed in claim 1 wherein the inflator bag responds to a greater degree to a predetermined inflating pressure at its centre and progressively less towards its ends.

7. A method as claimed in claim 1 wherein the core is self-supporting when changed to the rigid state.

8. A method as claimed in claim 1 wherein the inflator bag has a maximum diameter of expansion which is 10 to 50 percent greater than a diameter of the core.

* * * * *